United States Patent Office 3,254,065
Patented May 31, 1966

3,254,065
CYCLODODECYL ACRYLATE AND METH-
ACRYLATE, AND POLYMERS THEREOF
John R. Caldwell and Edward H. Hill, Kingsport, Tenn.,
assignors to Eastman Kodak Company, Rochester,
N.Y., a corporation of New Jersey
No Drawing. Filed Sept. 17, 1962, Ser. No. 224,207
11 Claims. (Cl. 260—83.5)

This invention relates to cyclododecyl acrylate and methacrylate, to resinous polymers thereof, and to processes for preparing the above compounds.

Polymeric alkyl acrylates and methacrylates are known to produce useful coatings, sheet materials, etc., and certain interpolymers and graft copolymers thereof, for example, with acrylonitrile have been used for the preparation of fibers and molded articles of improved dyeability. None of these prior art polymeric materials, however, have proven entirely satisfactory for many commercial applications. We have now found that polymeric acrylates and methacrylates om improved physical properties and of wider commercial applications can be prepared from acrylic and methacrylic acid esters having an alicyclic ring group of relatively high carbon content, i.e., cyclododecyl group of the empirical formula —$C_{12}H_{23}$. The new class of monomeric esters may be conveniently represented by the following structural formula:

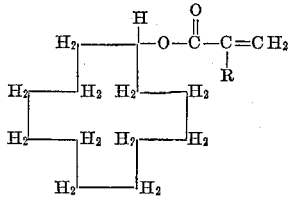

wherein R represents hydrogen or a methyl group. The polymers prepared from the above defined esters of the invention have unusually high softening points ranging about from 95°–250° C., and may be readily molded or extruded by the usual methods to give films, rods, and other shaped articles. Many of these polymers can also be dissolved in solvents and spun by wet or dry methods to give fibers of excellent physical properties.

It is, accordingly, an object of the invention to provide a new class of acrylic and methacrylic acid esters containing an alicyclic ring group of 12 carbon atoms. Another object is to provide soluble polymers of the above esters which are especially suitable for coating, molding, extruding and fiber-forming purposes. Another object is to provide methods for preparing the above-mentioned monomers and polymers. Other objects will become apparent hereinafter.

In accordance with the invention, we prepare the new monomeric cyclododecyl acrylate and methacrylate by esterifying cyclododecanol with acrylic or methacrylic acid, in the presence of an esterification catalyst, for example, p-toluenesulfonic acid. The monomer product may be purified by washing the reaction mixture with water and sodium bicarbonate slurry and then dried with anhydrous sodium sulfate. The proportions of the reactants may vary so that one or the other will be present in slight excess of equivalent quantities, but preferably the acrylic or methacrylic acid is used in slight excess. The temperature of the reaction may be varied about from 40–100° C., and preferably at the temperature of reflux. Normal, reduced or above atmospheric pressures may be used as desired.

The polymerizations of the new compounds of the invention alone or conjointly with one or more other ethylenically unsaturated, polymerizable compounds containing at least one

I.     —CH=C< group, or more especially containing a single

II.     $CH_2$=C< group, are accelerated by heat, by actinic light such as ultraviolet radiation and by polymerization catalysts such as peroxides including hydrogen peroxide, organic peroxides such as benzoyl peroxide, etc., persulfates such as ammonium persulfate, sodium persulfate, potassium persulfate, persulfuric acid, etc., perborates such as sodium perborate or other alkali metal perborates, azobis-nitriles, etc. Other catalysts such as boron trifluoride, azines, ketazines, etc., can also be used. Catalysts that are soluble in the organic phase include benzoyl peroxide, acetyl peroxide, tert-butyl hydroperoxide, azobis (isobutyronitrile) and the like. Mixtures of one or more of the mentioned catalysts can be employed. The amount of catalyst used can vary between the limits of about from 0.2 to 3.0%, based on the weight of monomer to be polymerized. The temperature of polymerization can vary over a wide range, but preferably the polymerizations are carried out at about from 30–100° C. Advantageously, a solvent or nonsolvent reaction medium may be employed including organic solvents such as lower alcohols, ketones or esters. Other solvents such as the aromatic or aliphatic hydrocarbons, dioxane and the glycol monoethers may be employed. The preferred nonsolvent is water. Mass or bulk polymerizations may also be used. For the polymerizations in water or aqueous systems, an emulsifying or dispersing agent in an amount of about 1–5% of the weight of the monomers can be employed with advantage. Suitable emulsifying agents include salts of higher fatty acids, e.g., sodium or potassium stearate, palmitate, etc., salts of higher fatty alcohol sulfates, e.g., sodium or potassium lauryl sulfate, sodium or potassium octadecyl sulfate, etc., sodium or potassium dodecyl benzene sulfonate, ordinary soaps, sulfonated mineral oils, and the like. Advantageously, an activating agent such as sodium bisulfite can be used in conjunction with the polymerization catalyst in about similar amount. Chain regulators such as alkyl mercaptans, e.g., hexyl, octyl, lauryl, etc., mercaptans can be added with advantage to the polymerization reaction mixtures. The polymeric products obtained by the above procedures can then be isolated, washed and dried by conventional methods for separating polymers from their polymerization mixtures.

The comonomers that are suitable for copolymerizing with the cyclododecyl acrylate and methacrylate of the invention include, for example, those described in U.S. Patent No. 2,396,785, dated March 19, 1946. Typical monomers include lower alkyl acrylates and methacrylates wherein the alkyl group in each instance contains from 1–4 carbon atoms, e.g., methyl acrylate, propyl acrylate, n-butyl acrylate, etc., and the corresponding methacrylates, vinyl carboxylic esters, e.g., vinyl acetate, vinyl propionate, vinyl butyrate, vinyl stearate, vinyl benzoate, etc., the corresponding isopropenyl carboxylic esters, vinyl alkyl ethers and ketones, e.g., vinyl methyl ether, vinyl butyl ether, vinyl methyl ketone, vinyl ethyl ketone, etc., vinyl halides, e.g., vinyl chloride, vinyl fluoride, vinylidene chloride, tetrafluoethylene, chlorotrifluoroethylene, etc., styrenes, e.g., styrene, a-methylstyrene, p-acetaminostyrene, p-methylstyrene, a-acetoxystyrene, etc., acrylic amides, e.g., acrylamide, methacrylamide, and N-alkyl and N,N-dialkyl substituents thereof wherein the alkyl group in each instance contains from 1–4 carbon atoms, N-vinyl imides, N-vinyl lactams, derivatives of unsaturated dibasic acids, e.g., maleates, maleamites, maleamates, maleimides, etc., the esters, amides and ester-amides of fumaric, itaconic and citraconic acids, olefinic hydrocarbons and derivatives such as as ethylene, isobutylene, butadiene, isoprene, 2,3-dimethylbutadiene, 2-chlorobutadiene, 2-cyanobutadiene, 2-phenylbutadiene and 2-acetoxybutadiene, and the like. The proportions of the components in the interpolymers can vary from 10–95% by weight of the cyclododecyl acrylamide or methacrylamide and from 90–5% by weight of the other polymerizable comonomer. In general, the copolymers obtained have been found to contain approximately the same proportion of components or substituents as were present in the starting polymerization mixtures.

The following examples further illustrate the novel monomers and polymers of the invention and the manner of preparing the same.

EXAMPLE 1

*Cyclododecyl acrylate*

Cyclododecanol was esterified by refluxing a solution containing 46 g. (0.25 mole) of the alcohol, 21.6 g. (0.3 mole) of acrylic acid, 300 ml. benzene, 1 g. methylene blue, and 5 g. of p-toluenesulfonic acid. The water which was formed was collected in a Dean-Stark trap filled with benzene. After the theoretical amount of water was obtained, the solution was cooled, washed, with water, stirred with a sodium bicarbonate slurry, washed with water again, and dried with sodium sulfate. After concentration, the product was distilled and collected at 121–122° C./2 mm., $$n\frac{20}{D} = 1.4385$$

EXAMPLE 2

*Cyclododocecyl methacrylate*

Using the method of Example 1 cyclododecanol was esterified with 25.8 g. (0.3 mole) methacrylic acid. The product was collected at 127–128.5° C./2.4 mm., $$n\frac{20}{D} = 1.4398$$

EXAMPLE 3

The following materials were placed in a pressure bottle and tumbled at 50° C. for 24 hours:

70 g. acrylonitrile
30 g. cyclododecyl acrylate
300 ml. acetonitrile
1.0 g. azobis(isobutyronitrile)

A clear, viscous dope was obtained which was dry spun to give fibers having the following physical properties:

Tenacity: 2.4 g./d.
Elongation: 18%
Hot bar sticking point: 198° C.
Flow point at 0.2 g./d.: 194° C.

EXAMPLE 4

The following materials were placed in a pressure bottle and tumbled at 50° C. for 18 hours:

80 g. acrylonitrile
20 g. cyclododecyl acrylate
500 ml. water
4.0 g. lauryl sulfate
1.0 g. ammonium persulfate
0.5 g. sodium bisulfite
0.5 g. tert-dodecyl mercaptan The polymer was filtered, washed with water then isopropyl alcohol, and dried. It weighed 96.5 g. It was dissolved in dimethylformamide and wet spun into fibers having the following properties:

Tenacity: 3.6 g./d.
Elongation: 15%
Hot bar sticking point: 240–250° C.
Flow point at 0.2 g./d.: 256° C.

EXAMPLE 5

Using the method of Example 4, a copolymer was prepared having the composition 75 parts acrylonitrile-25 parts cyclododecyl methacrylate. The polymer was compression molded into buttons having the following properties:

Modulus: $3.7 \times 10^5$ p.s.i.
Elongation: 12%
Tensile strength: 8500 p.s.i.
Heat distortion temperature: 125° C.

EXAMPLE 6

Using the method of Example 4, a copolymer was prepared having the composition 80 parts acrylonitrile-20 parts cyclododecyl methacrylate. It was dissolved in dimethylformamide and wet spun into fibers having the following properties:

Tenacity: 3.4 g./d.
Elongation: 17%
Hot bar sticking point: 231° C.
Flow point at 0.2 g./d.: 230° C.

EXAMPLE 7

The following materials were placed in a pressure bottle and tumbled at 50° C. for 20 hours:

65 g. cyclododecyl acrylate
35 g. vinyl chloride
2.0 g. sulfonated mineral oil
1.0 g. ammonium persulfate
800 ml. water The product was a white powder which after washing and drying weighed 87 g. The polymer was soluble in cyclohexanone and could be cast into clear, tough films.

EXAMPLE 8

The following materials were placed in an autoclave:

30 g. cyclododecyl acrylate
70 g. butadiene
3.0 g. soap
1.0 g. potassium persulfate
400 ml. water.

The mixture was stirred at 70° C. for 48 hours. The product was a rubbery material which weighed 91 g.

EXAMPLE 9

Using the method of Example 3 a copolymer was prepared having the composition 65 parts cyclododecyl methacrylate-35 parts methyl methacrylate. It could be compression molded into clear, hard buttons.

EXAMPLE 10

The following materials were mixed in a pressure bottle and tumbled at 50° C. for 24 hours:

50 g. cyclododecyl acrylate
300 ml. tert-butyl alcohol
0.5 g. azobis(isobutyronitrile)

A polymer was obtained which was soluble in dioctyl sebacate and was useful as a viscosity stabilizer in this synthetic lubricant. It had a hot bar stick point of 95° C.

EXAMPLE 11

Using the method of Example 4, a copolymer was prepared having the composition 77 parts styrene-23 parts cyclododecyl methacrylate. It could be molded into objects having excellent optical clarity and impact strength.

EXAMPLE 12

Using the method of Example 4, a copolymer was prepared having the composition 50 parts vinyl stearate-50 parts cyclododecyl acrylate. The polymer was soluble in mineral oil and was useful as a viscosity stabilizer in oils.

EXAMPLE 13

Using the method of Example 4, a copolymer was prepared having the composition 60 parts vinylidene chloride-40 parts cyclododecyl acrylate. Clear, strong films could be cast from dioxane.

EXAMPLE 14

Using the method of Example 4, a copolymer was prepared having the composition 70 parts methacrylonitrile-30 parts cyclododecyl methacrylate. It could be cast into clear, flexible films from a solution of acetone.

By following the procedures described in the preceding copolymeric examples still other copolymers coming within the defined limits of the invention and in the specified proportions of from 10–95% by weight of the cyclododecyl acrylate and methacrylate and from 90–5% of the comonomer can be prepared with any of the mentioned comonomers of above I and II by substituting them in these examples. Thus, copolymers of generally similar characteristics are obtained with comonomers such as vinyl and isopropenyl carboxylic esters, vinyl alkyl ethers and ketones, vinylidene fluoride, N-vinyl imides, N-vinyl lactams, alkyl esters of maleic, fumaric, itaconic and citraconic acids, acrylamide, methacrylamide, N-alkyl and N,N-dialkyl acrylamides and methacrylamides, lower alkyl acrylates and methacrylates, etc. The homopolymers and all of the copolymers of the invention are soluble in one or more organic solvents from which solutions they can be spun into fibers or coated into tough, flexible films, sheets, etc. Also, they can be readily converted to shaped articles by injection and compression molding techniques. If desired, the above solutions and compositions may advantageously have incorporated therein various materials such as fillers, pigments, dyes, plasticizers and the like.

The invention has been described in detail with particular reference to preferred embodiments thereof, but it will be understood that variations and modifications can be effected within the spirit and scope of the invention as described hereinabove and as defined in the appended claims.

What we claim is:

1. A compound selected from the group consisting of cyclododecyl acrylate and cyclododecyl methacrylate.
2. Cyclododecyl acrylate.
3. Cyclododecyl methacrylate.
4. A resinous polymer of a compound selected from the group consisting of cyclododecyl acrylate and cyclododecyl methacrylate.
5. A resinous copolymer of from 10–95% by weight of cyclododecyl acrylate and from 90–5% by weight of acrylonitrile.
6. A resinous copolymer of from 10–95% by weight of cyclododecyl acrylate and from 90–5% by weight of vinyl chloride.
7. A resinous copolymer of from 10–95% by weight of cyclododecyl acrylate and from 90–5% by weight of butadiene.
8. A resinous copolymer of from 10–95% by weight of cyclododecyl acrylate and from 90–5% by weight of vinylidene chloride.
9. A resinous copolymer of from 10–95% by weight of cyclododecyl methacrylate and from 90–5% by weight of acrylonitrile.
10. The process for producing a polymeric composition comprising heating a mixture of monomeric cyclododecyl acrylate and a polymerization catalyst at from 30–100° C.
11. The process for producing a polymeric composition comprising heating a mixture of monomeric cyclododecyl methacrylate and a polymerization catalyst at from 30–100° C.

References Cited by the Examiner

UNITED STATES PATENTS 2,479,490  8/1949  Guinot et al. _____ 260—83.5

FOREIGN PATENTS 449,790  7/1948  Canada.

JOSEPH L. SCHOFER, *Primary Examiner.*

LEWIS GOTTS, *Examiner.*

F. M. SIKORA, *Assistant Examiner.*